US008095180B2

(12) United States Patent
Lee et al.

(10) Patent No.: US 8,095,180 B2
(45) Date of Patent: Jan. 10, 2012

(54) MOBILE TERMINAL

(75) Inventors: Woo-Jin Lee, Seoul (KR);
Kyoung-Taek Lim, Gyeonggi-Do (KR);
Byung-Duck Park, Gyeonggi-Do (KR);
Sang-Chul Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 421 days.

(21) Appl. No.: 12/422,924

(22) Filed: Apr. 13, 2009

(65) Prior Publication Data

US 2010/0081470 A1 Apr. 1, 2010

(30) Foreign Application Priority Data

Sep. 29, 2008 (KR) ........................ 10-2008-0095598

(51) Int. Cl.
*H04M 1/00* (2006.01)
(52) U.S. Cl. .................................... 455/556.1; 455/90.3
(58) Field of Classification Search .................. 379/419, 379/368, 433.07; 362/88; 455/556.1, 90.3
See application file for complete search history.

(56) References Cited

U.S. PATENT DOCUMENTS

| 4,936,668 | A | * | 6/1990 | Mori | 385/31 |
| 5,237,607 | A | * | 8/1993 | Diamantis | 379/419 |
| 5,542,016 | A | * | 7/1996 | Kaschke | 385/123 |
| 7,452,098 | B2 | * | 11/2008 | Kerr | 362/154 |

FOREIGN PATENT DOCUMENTS

| DE | 10319672 | 11/2004 |
| GB | 2388489 | 11/2003 |
| WO | 98/47123 | 10/1998 |
| WO | 02/098006 | 12/2002 |

\* cited by examiner

*Primary Examiner* — Brian Young
(74) *Attorney, Agent, or Firm* — Lee, Hong, Degerman, Kang & Waimey

(57) ABSTRACT

A mobile terminal includes a housing comprising a light emitting portion disposed on at least a portion of the housing, a light emitting unit disposed inside the housing, a light transmission member configured to transmit light emitted from the light emitting unit, and a guiding structure formed on the light transmission member and configured to direct and emit the light toward the light emitting portion.

19 Claims, 7 Drawing Sheets

MOBILE TERMINAL

CROSS REFERENCE TO RELATED APPLICATIONS

Pursuant to 35 U.S.C. §119(a), this application claims the benefit of earlier filing date and right of priority to Korean Application No. 10-2008-0095598 filed on Sep. 29, 2008, the contents of which are hereby incorporated by reference herein in their entirety.

FIELD OF THE INVENTION

The present invention relates to a mobile terminal emitting light transmitted via a light transmission member having a unique guiding structure to maximize the light emission.

DESCRIPTION OF THE RELATED ART

A mobile terminal is a device that can be carried and has one or more functions such as voice and video call communication, inputting and outputting information, storing data, and the like. As the functions of the mobile terminal become more diversified, the mobile terminal is implemented in the form of a multimedia player supporting more complicated functions such as capturing images or video, reproducing music or video files, playing games, receiving broadcast signals, and the like.

In order to implement various functions of such multimedia players or devices, numerous attempts are being made and implemented in terms of hardware or software. For example, a user interface allowing users to easily and conveniently search for and select one or more functions is provided.

Further, as users consider their mobile terminals as personal belongings to express their personality, mobile terminals are expected to have various designs. An attempt using light may be considered in terms of the user interface environment and designs.

SUMMARY OF THE INVENTION

In accordance with one embodiment, a mobile terminal includes a housing including a light emitting portion disposed on at least a portion of the housing, a light emitting unit disposed inside the housing, a light transmission member configured to transmit light emitted from the light emitting unit, and a guiding structure formed on the light transmission member and configured to direct and emit the light toward the light emitting portion.

In accordance with one embodiment, a mobile terminal includes a cover having a window region covering a display module a frame coupled to the cover and having an opening at a central region of the frame to receive the display module, a light emitting unit disposed in a space confined by the cover and the frame, a light transmission member disposed and extended along at least a portion of contour of the frame to receive and transmit light generated from the light emitting unit, and a guiding structure formed at the light transmission member and configured to guide light transmission in a direction that is away from a lengthwise direction of the light transmission member to emit the light toward the frame, wherein the frame is made of a material allowing the light to be transmitted therethrough.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
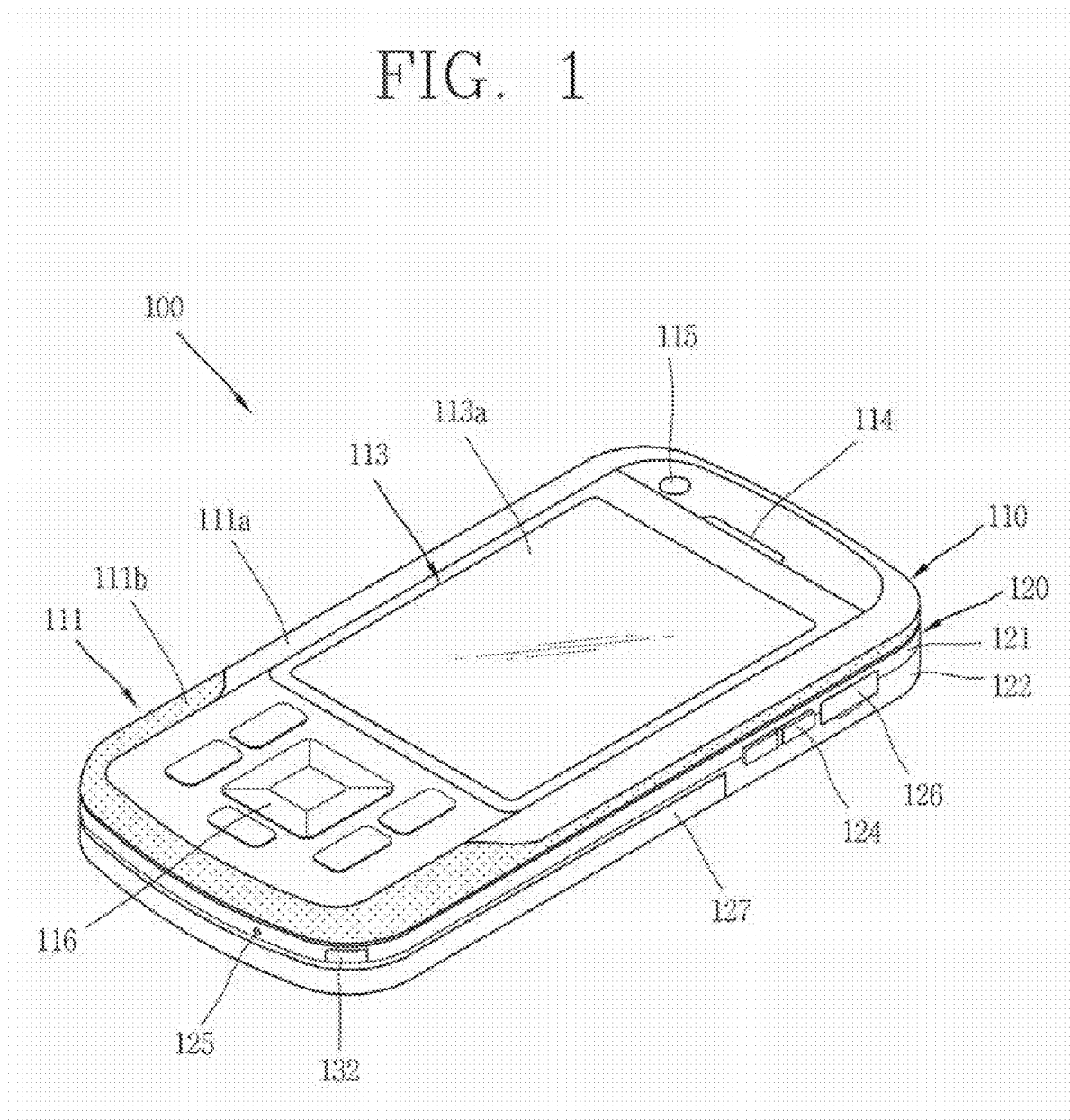
FIG. 1 is a front perspective view of a mobile terminal according to an embodiment of the present invention.

FIG. 1 is a perspective view of a mobile terminal according to an embodiment of the present invention. The mobile terminal 100 includes a first body 110, and a second body 120 that can be slidably moved along at least one direction with respect to the first body 110. The disclosed embodiments are not limited to the disclosed form and may be applicable to any types of mobile terminals such as a bar type mobile terminal, a folder type mobile terminal, a swing type mobile terminal, a swivel type mobile terminal, or the like.

Figure 2:
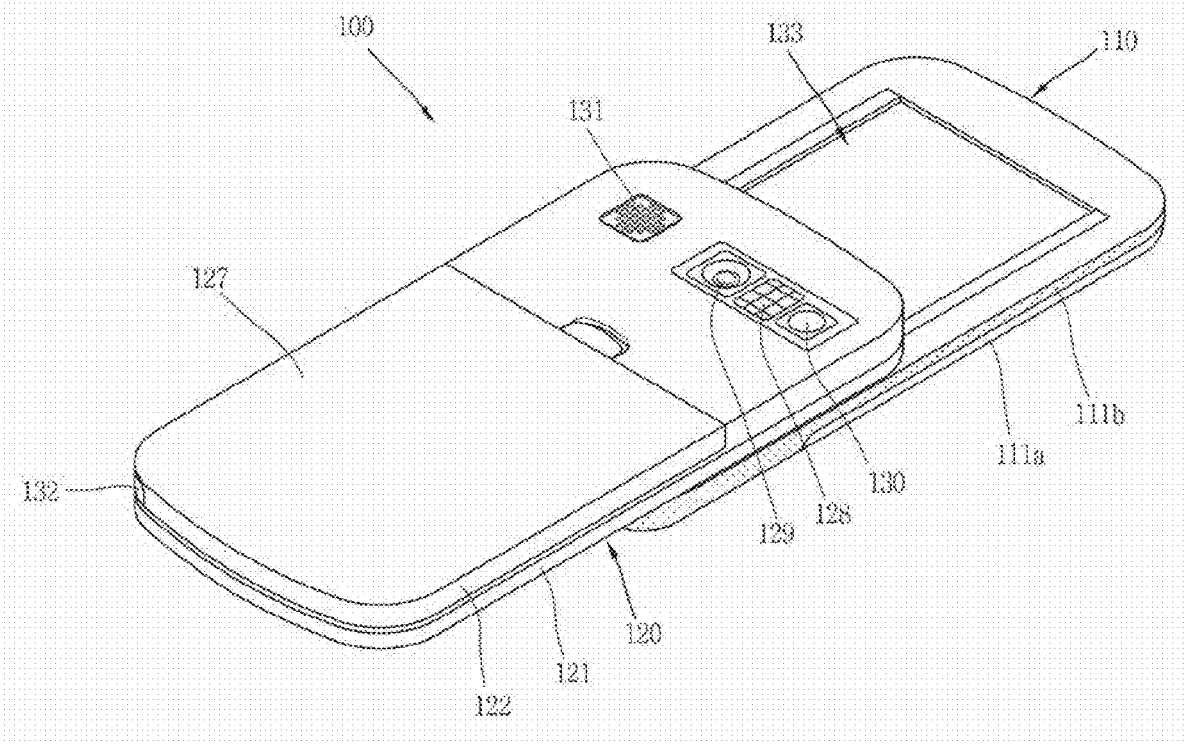
FIG. 2 is a rear perspective view showing an open configuration of the mobile terminal shown in FIG. 1.

A state in which the first body 110 is disposed to overlap with the second body 120, as shown in FIG. 1, is a closed configuration, and a state in which at least a portion of the second body 120 is exposed with respect to the first body 110, as shown in FIG. 2, is an open configuration. In the closed configuration, the mobile terminal 100 operates in a standby or idle mode, and the standby mode may be released upon user manipulation. The mobile terminal 100 generally operates in a calling mode or the like in the open configuration, and the mode can be changed to the standby mode with a lapse of time or upon user manipulation.

Figure 3:
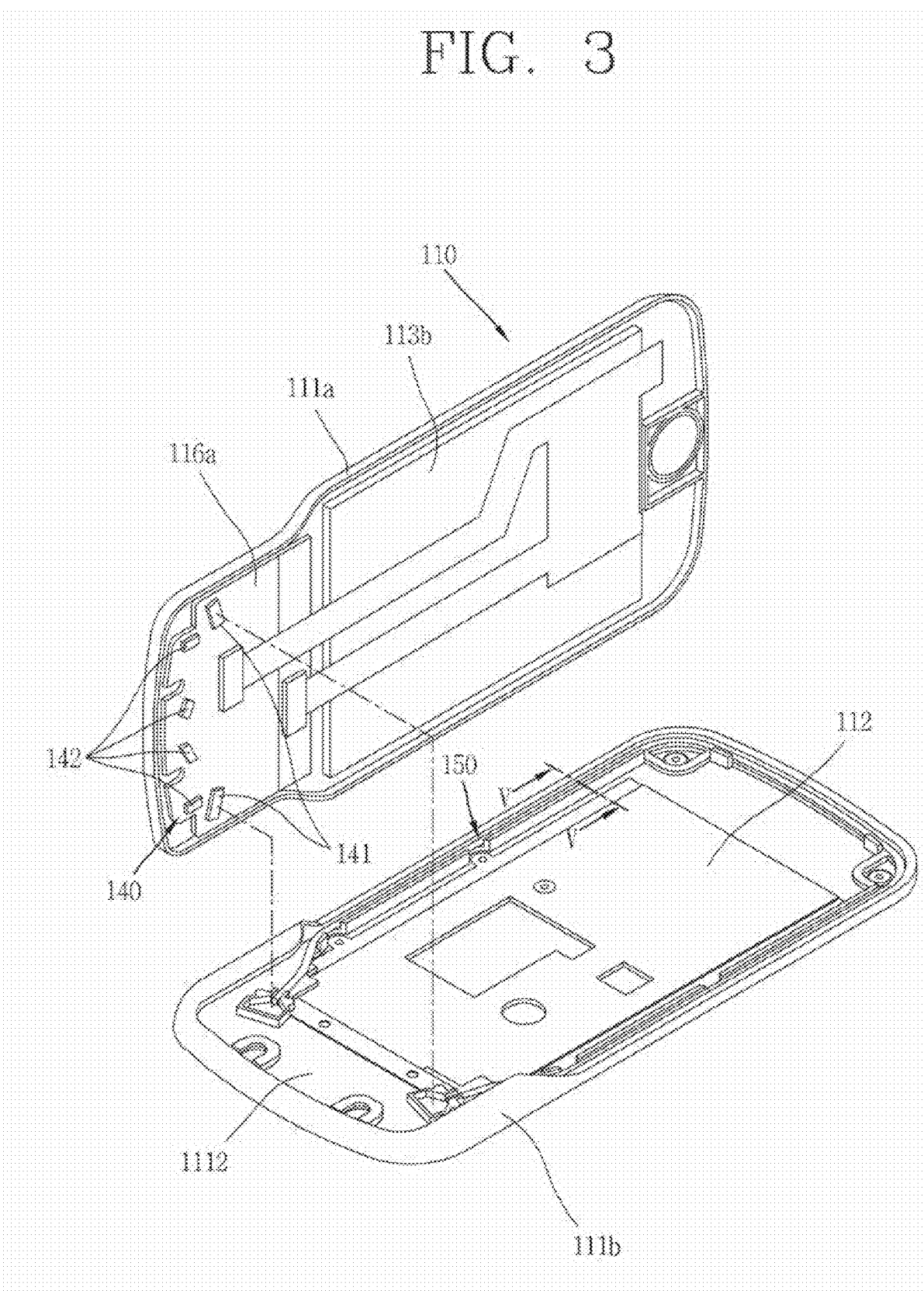
FIG. 3 is an exploded perspective view of a first body of the mobile terminal shown in FIGS. 1 and 2.

The case, such as casing, housing, or the like, constituting the external appearance of the first body 110 may include a front case 111 and a rear case 112 shown in FIG. 3. Various electronic components are installed in the space between the front case 111 and the rear case 112. The front case 111 may be formed as a single member or by combining a cover 111a and a frame 111b, as exemplified in FIG. 3.

The surface exposed from the frame 111b may make a surface or side surface crossing a main surface of the cover 111a where a window region 113a is formed. The window region 113a of the cover 111a can transmit light emitted from the display module 113b shown in FIG. 3. The portions surrounding the window region 113a is preferably formed not to allow light transmission to increase the visibility of the display unit 113. The front and rear cases 111, 112 may be formed by injection-molding a synthetic resin or may be made of a metallic material such as stainless steel (STS) or titanium (Ti), or the like. When the cover 111a is made of a metal material, the window region 113a may be formed as a separate light transmissive resin injection-molded product.

The display unit 113, the audio output unit 114, a first image input unit 115 or a first manipulation unit 116 may be accessible through the first body 110, specifically, through the cover 111a of the front case 111. The display unit 113 may include a display module such as an Liquid Crystal Display (LCD), an Organic Light Emitting Diode (OLED), a Transparent OLED (TOLED), and the like, that visually displays information.

The display unit 113 may include a touch sensor so as to be configured as a touch screen to receive information according to a user touch. The display unit 113 may be configured to generate various haptic effects such that the user may feel the sense of touch. This may be implemented by a haptic module interworking with the display unit 113. A typical example of the haptic effects generated by the haptic module is vibration. The haptic module may be variably disposed according to configuration of the mobile terminal 100 as well as the display unit 113.

The audio output unit 114 may be implemented in the form of a receiver or a speaker. The first image input unit 115 may be implemented in the form of a camera for capturing an image or video.

The first manipulation unit 116 receives a command for controlling the operation of the mobile terminal 100. When the first manipulation unit 116 is formed as a pressing type key, an opening or a hole exposing the key is formed on the metallic cover 111a. When the first manipulation unit 116 is implemented as a touch type key, the cover 111a may not include an opening.

Like the first body 110, the front case 121 and the rear case 122 may form the case of the second body 120. A second manipulation unit 123 may be disposed at the second body 120, specifically, on the front face of the front case 121. Further, a third manipulation unit 124, a first audio input unit 125, and an interface 126 may be disposed on at least one of the front case 121 and the rear case 122.

The first to third manipulation units 116, 123, and 124 may be generally referred to as a manipulating portion, and any type of mechanism can be employed for the manipulation unit so long as they can be operated by the user in a tactile manner. For example, the manipulation unit can be implemented as a dome switch, a touch screen or a touch pad that can receive commands or information according to the user's push or touch operation, or may be implemented in the form of a wheel or jog for rotating keys, a joystick, or the like.

In terms of their functions, the first manipulation unit 116 is used for inputting commands such as start, end, scroll or the like, and the second manipulation unit 123 is used for inputting numbers, characters, symbols, or the like. The third manipulation unit 124 may be operated as a hot key for performing a special function such as activation of the first image input unit 115.

The first audio input unit 125 may be implemented in the form of, for example, a microphone to receive user voice inputs, other sounds, and the like. The interface unit 126 may be implemented in the form of a connection port for connecting an earphone to the mobile terminal 100 via a fixed or wireless means, power supply ports for providing power to the mobile terminal 100, a port for short-range communications, such as an Infrared Data Association (IrDA) port, a Bluetooth™ port, a wireless LAN port, or the like.

Also, the interface unit 126 may be a card socket for accommodating a Subscriber Identification Module (SIM) card or a User Identity Module (UIM) card, or an external card such as a memory card for storing information. The power supply unit 127 for supplying power to the mobile terminal 100 may be located at the rear case 122. The power supply unit 127 may be, for example, a rechargeable battery that can be detached for charging power.

FIG. 2 is a rear perspective view of the mobile terminal 100 in the open configuration. As shown in FIG. 2, a second image input unit 129 may be additionally mounted on the rear surface of the rear case 122 of the second body 120. The second image input unit 129 may have an image capture direction which is substantially opposite to the first image input unit 115 shown in FIG. 1 and may support a different resolution compared to the first image input unit.

For example, the first image input unit 115 may operate with a relatively lower resolution to capture the user's face and transmit the same to the another party during video call communication or the like, while the second image input unit 129 may operate with a relatively higher resolution to capture a general subject with higher picture quality. Pictures taken by the second image input unit 129 may not be transmitted immediately but may be saved for later use.

A flash 128 and a mirror unit 130 may be disposed adjacent to the second image input unit 129. When an image of the subject is captured with the second image input unit 129, the flash 128 illuminates the subject. The mirror unit 130 allows the user to see a self image when capturing user's image by using the second image input unit 129.

The second audio output unit 131 may be additionally disposed on the rear case 122. The second audio output unit 131 may implement a stereophonic function in conjunction with the first audio output unit 114 shown in FIG. 1, and may also be used during a call operation in a speaker phone mode.

A broadcast signal reception antenna 132 may be disposed at one side of the rear case 122, in addition to an antenna used for call communication. The antenna 132 may be installed such that it can be extended from the second body 20.

One part of the slide module 133 that slidably combines the first body 110 and the second body 120 may be disposed on the rear case 112 of the first body 110. The other part of the slide module 133 may be disposed on the front case 121 of the second body 120, which may not be exposed as shown in FIG. 2.

In the above description, the second image input unit 129, the second audio output unit 131, the flash 128 and the mirror unit 130 are disposed on the second body 120, but this embodiment is not limited to such a configuration. For example, one or more of the elements 128 to 132 which are disposed on the rear case 122, such as the second image input unit 129, may be mounted on the first body 110. Alternatively, even if the second image input unit 129 is not provided, the first image input unit 115 may be configured to rotate or otherwise be moved to allow image capturing in various directions.

Referring back to FIG. 1, light may be output via the frame 111b in association with an operation of the mobile terminal 100. For example, the operation may be a slidable movement, music playing, video reproducing, chatting, or the like.

Light generated in such manner may be output to the lateral direction of the mobile terminal 100, unlike light output from the display unit 113 or via the first manipulation unit 116. This provides a new type of light emission, allowing people around the mobile terminal 100 as well as the user of the mobile terminal to recognize the light emission. A configuration of the mobile terminal 100 allowing such light emission will be described with reference to FIGS. 3 to 9.

Figure 4:
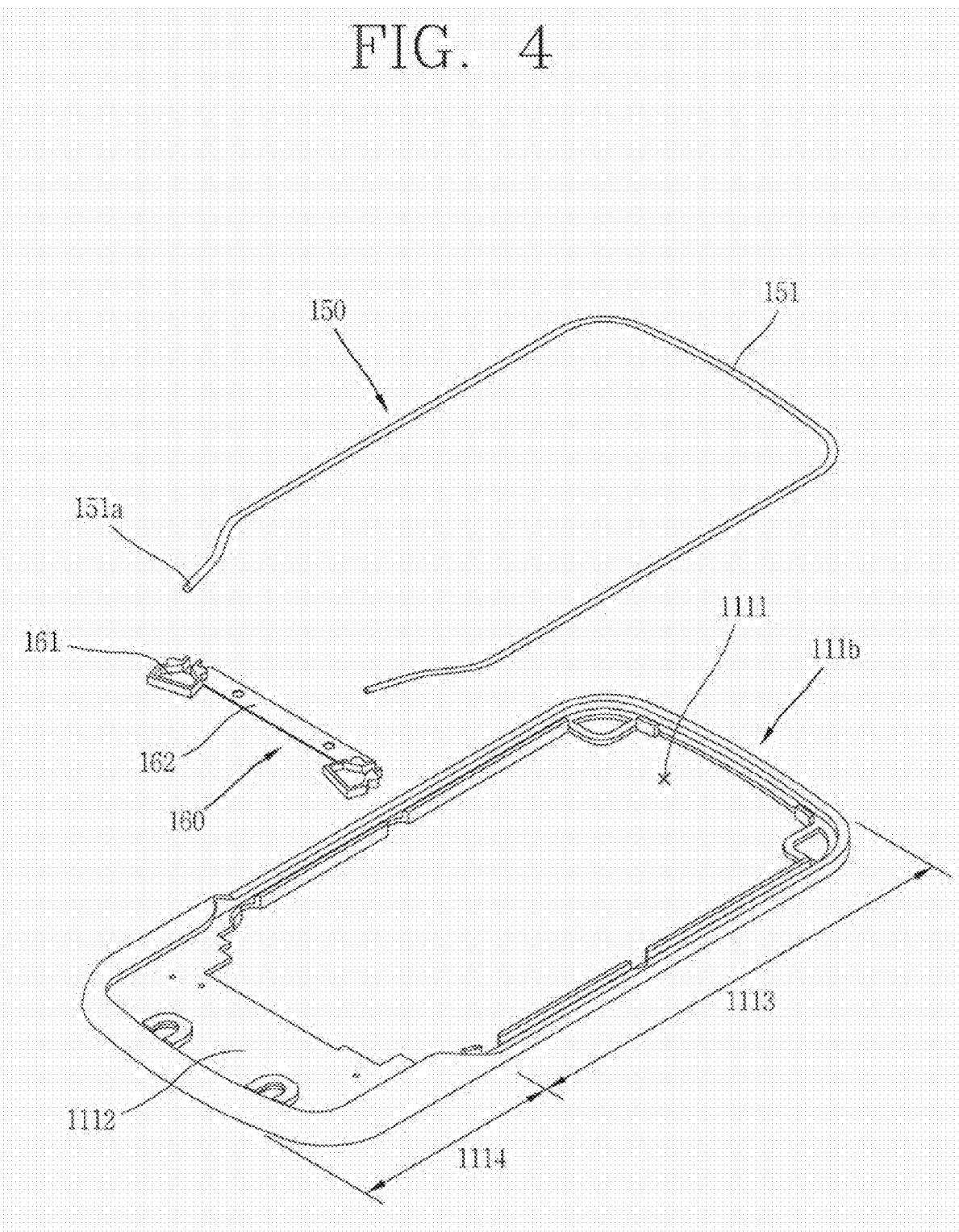
FIG. 4 is an exploded perspective view showing a frame of the first body, a light transmission member, and a condensing or light collecting unit shown in FIG. 3.

FIG. 3 is an exploded perspective view of the first body 110 of the mobile terminal 100 shown in FIG. 1, and FIG. 4 is an exploded perspective view showing the frame 111b, a light transmission member 150, and a condensing or light collecting unit 160 also shown in FIG. 3. With reference to FIGS. 3 and 4, the cover 111a is mounted on the frame 111b. Accordingly, the front surface of the mobile terminal 100 is mostly formed by the cover 111a.

The display module 113b is mounted at one portion of the cover 111a such that its position corresponds to a position of the window region 113a. An electric wire to which one end of the display module 113b, for example, the other end of a flexible printed circuit board (FPCB) is connected with a circuit board 116a mounted at other portion of the cover 111a. Switches, for example, dome switches, constituting a portion of the first manipulation unit 116 are disposed at the side, facing the cover 111a, of the circuit board 116a and manipulated by an exposed key.

A light emitting unit 140 is disposed on a portion that does not face the cover 111a of the circuit board 116a. The light emitting unit 140 includes a plurality of light emitting elements such as LEDs. The light emitting unit 140 may include a first light emitting unit 141 and a second light emitting unit 142. The first manipulation unit 116 is backlighted by light emitting element(s) disposed adjacent to the dome switches. When a hole is formed at the circuit board 116a, the light emitting unit 140 may also backlight the exposed key such as the first manipulation unit 116.

In this embodiment, the first light emitting unit 141 includes a pair of light emitting elements facing a second region 1114 adjacent to the first region 1113. The second light emitting unit 142 is disposed to face the second region 1114 and one or a plurality of second light emitting units may be provided as necessary. Light generated from the first light emitting unit 141 proceeds externally mainly via the first region 1113 of the frame 111b, and light generated from the second light emitting unit 142 proceeds externally via the second region 1114 of the frame 111b without an intermediate medium.

The first and second light emitting units 141 and 142 may be operated in a plurality of different modes according to the operation of the mobile terminal 100. The first and second light emitting units 141 and 142 may emit light successively or intermittently. When the first and second light emitting units 141 and 142 emit light intermittently, intervals between the light emission time points may vary and the duration of light emission may also vary. The first and second light emitting units 141 and 142 may emit light in the same pattern or in different patterns.

Figure 5:
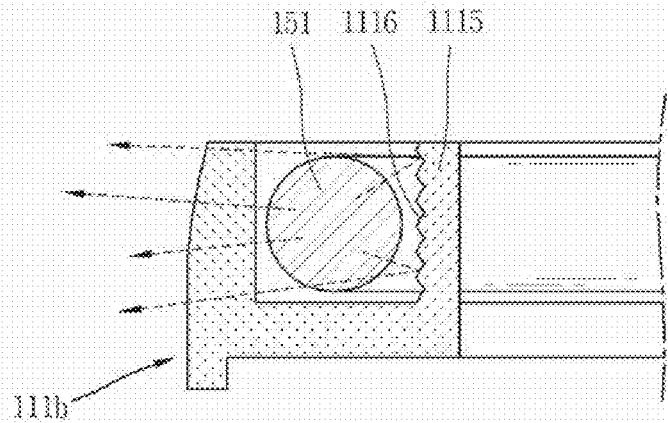
FIG. 5 is a sectional view taken along the line V-V of FIG. 3 to show a portion of a channel receiving the light transmission member.

The light transmission member 150 is disposed to be associated with the light emitting unit 140 to receive light generated from the light emitting unit 140. The light transmission member 150 is also disposed to be associated with the frame 111b to allow received light to be emitted via the frame 111b. In this embodiment, the light transmission member 150 is positioned in a channel formed along the outline of the first region 1113 of the frame 111b. The channel is formed by at least a pair of separation walls 1115 confining the position where the light transmission member 150 is to be disposed. The separation wall 1115 is shown in FIG. 5.

The light transmission member 150 may be a lighting tube 151 or an optical fiber that transmits light mainly along its lengthwise direction. The lighting tube 151 extends in a lengthwise direction and is disposed along the outline of the frame 111b. Implementation of the light transmission member 150 overcomes a structural limitation of which the light emitting elements and the circuit board can be hardly disposed in the narrow space.

The frame 111b is made of a light transmissible material and may also be called a light-transmissive portion. Here, the light-transmissive portion may also be made of a translucent material. When the light-transmissive portion is made of the translucent material, while it would be difficult to see the interior, the corresponding portion may be emphasized to be recognized relative to an opaque portion when light is emitted.

As described above, the frame 111b may be divided into the first region 1113 where most part of the light transmission member 150 is disposed and a second region 1114 where no or very small part of the light transmission member 150 is disposed. Compared with the first region 1113, the second region 1114 may be relatively thicker or wider. Accordingly, a portion of the second region 1114 may form a portion of the front surface of the mobile terminal 100 together with the cover 111a.

An opening 1111 is formed at the first region 1113. Owing to the opening 1111, the display module 113b or the rear case 112 may be disposed without increasing the thickness of the mobile terminal 100. The rear case 112 may also constitute a portion of the slide module 133. The front case 121 of the second body 120 is formed in the similar manner as the rear case 112, and when the front case 121 is slidably combined with the rear case 112, they form another portion of the slide module 133.

A support 1112 may be formed at the second region 1114 to support the circuit board 116a. The support 1112 may also serve to supplement the rigidity of the frame 111b.

The condensing unit 160 may be disposed at the support 1112. The condensing unit 160 is configured to allow more light generated from the first light emitting unit 141 to proceed to an end portion 151a of the lighting tube 151. In this embodiment, the condensing unit 160 includes condensing boxes 161 provided to receive both end portions of the lighting tube 151. The condensing boxes 161 include one main surface and side portions extending from the main surface. One portion of the side portions is open, and an end portion 151a of the lighting tube 151 is inserted into the open portion. The first light emitting unit 141 installed at the circuit board 116a is inserted through the opened portion. As for the condensing boxes 161, metal platy material is formed to cover the first light emitting unit 151 to allow light proceeding to the end portion 151a to be smoothly reflected. A pair of condensing boxes 161 may be coupled with a mounting bar 162 and then mounted at the support 1112. Thus, the alignment of the condensing boxes 161 can be more stably maintained.

In the above description, the first light emitting unit 141 and the condensing boxes 161 are provided to be associated with the both ends 151a of the lighting tube 141. But, the above described configuration may be provided for only one end portion 151a. In addition, a plurality of lighting tubes may be provided. A pair of the lighting tubes may be disposed such that they respectively correspond to the first light emitting unit 141 and have the same shape as the lighting tube 151.

FIG. 5 is a sectional view taken along the line V-V of FIG. 3 to show the channel receiving the lighting tube 151 shown in FIG. 4. With reference to FIG. 5, the channel is formed by the separation wall 1115. Light can be output in various directions from the light tube 151 disposed between at least a pair of the separation walls 1115. While light is emitted primarily to the outside of the frame 111b in the present embodiment, some light may be emitted in other directions. Therefore, a diffusion pattern 1116 is formed at the separation wall 1115.

The diffusion pattern 1116 is a pattern formed on the surface of the separation wall 1115 such that it has a depressed or concave portion and a protruded or convex portion, allowing at least a portion of light proceeding in directions other than the intended direction to be diffused thereby so as to proceed to outside the frame 111b. With the diffusion pattern 1116, the amount of light emitted in the lateral direction of the mobile terminal 100 can be increased, thus improving the light emission effect.

Figure 6:
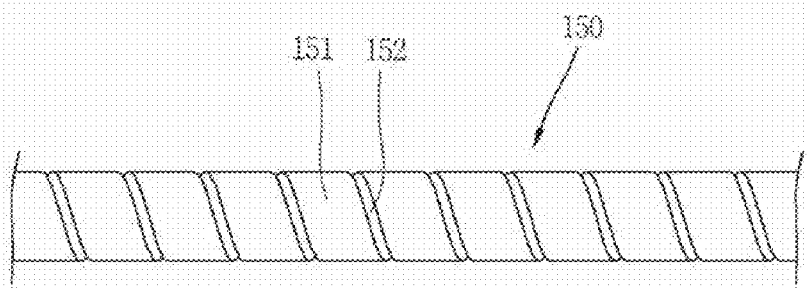
FIG. 6 is a lighting tube with a guiding structure according to an embodiment of the present invention.

FIG. 6 shows one example of a lighting tube 151. Referring to FIG. 6, a guiding portion or guiding structure is formed on an outer surface of the lighting tube 151 to guide light transmitted via the lighting tube 151 to proceed to the outside via the frame 111b. As an example of the guiding structure, recesses or grooves 152 are formed at regular intervals in the form of screw threads on an outer surface of the lighting tube 151.

While light proceeds mostly along the lengthwise direction along the lighting tube 151, the recesses 152 allow more light to be emitted in a direction away from the lengthwise direction or the central line of the lighting tube 151. As a result, the light generated from the first light emitting unit 141 can be effectively discharged to the outside of the frame 111b via the lighting tube 151. Alternative to the recesses 152, the surface of the lighting tube 151 may be sanded or a portion of the lighting tube 151 may be branched to obtain the same or similar effect.

Figure 7:
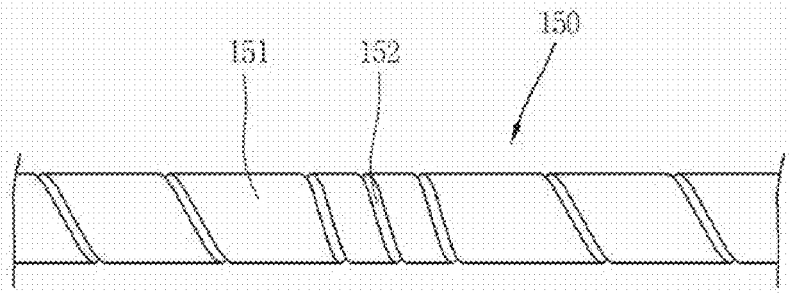
FIG. 7 is a lighting tube with a guiding structure according to an embodiment of the present invention.

FIG. 7 shows an alternative embodiment of the lighting tube 151. With reference to FIG. 7, the recesses 152 formed on the lighting tube 151 are not regularly distributed. In other words, more recesses 152 are distributed at a central portion of the lighting tube 151 while less recesses 152 are distributed at a peripheral portion of the lighting tube 151. Accordingly, more light will be emitted at the central portion of the lighting tube 151 compared with the peripheral portion. When a particular portion of the mobile terminal 100, for example, a portion of the side corresponding to a portion where the first audio output unit 114, shown in FIG. 1, is formed is desired to be emphasized, the recess 152 may be concentratively formed at the portion of the lighting tube 151 corresponding to the portion.

Figure 8:
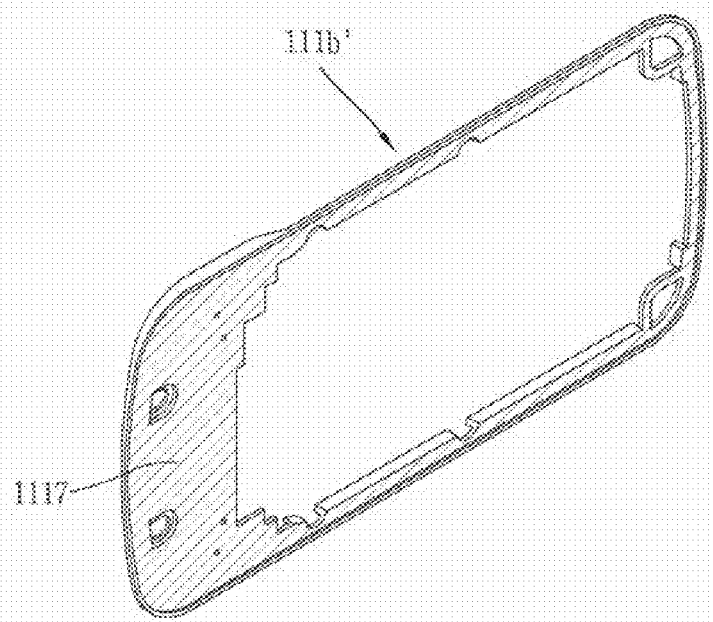
FIG. 8 is a perspective view of a frame of the first body according to an embodiment of the present invention.

FIG. 8 is a perspective view of a frame 111b' according to an embodiment of the present invention. The frame 111b', which has been modified from the frame 111b shown in FIG. 4, is similar to the above-mentioned case, except that a reflection layer 1117 is formed on a lower surface thereof. The reflection layer 1117 may be made of a material that can reflect light, for example, metal particles such as nickel or the like. Due to the reflection layer 1117, light, which has proceeded to the lower surface of the frame 111b' while moving via the lighting tube 151, changes its proceeding direction to proceed to the outside via the side of the frame 111b'.

Figure 9:
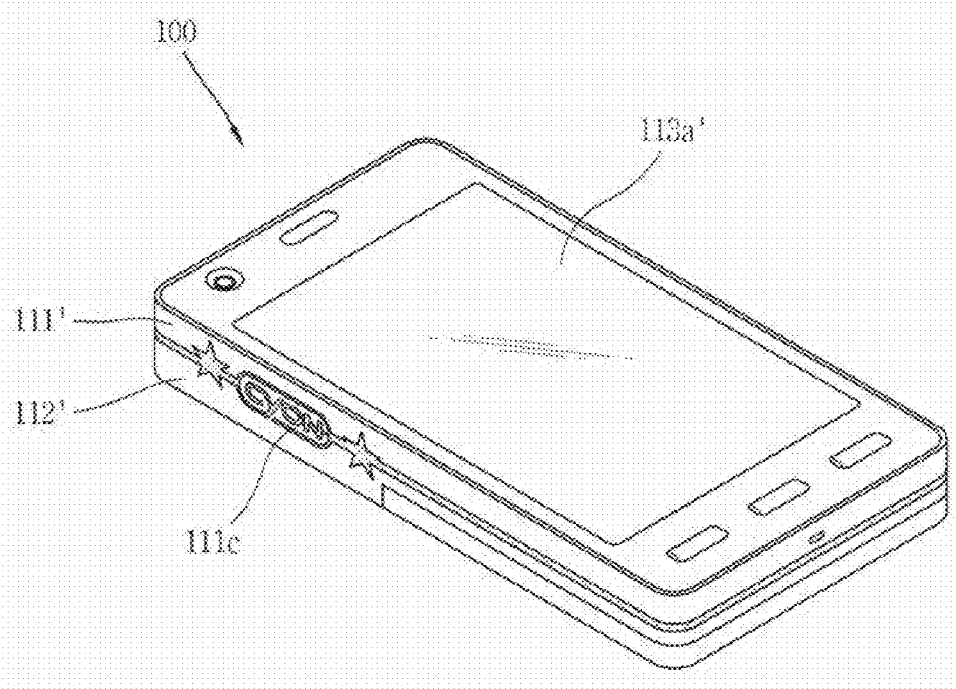
FIG. 9 is a perspective view of a mobile terminal according to an embodiment of the present invention.

FIG. 9 is a perspective view of a mobile terminal according to an embodiment of the present invention. Unlike the above-described embodiment in which the first case 111 is divided into the cover 111a and the frame 111b, as shown in FIG. 1, a first case 111' is formed as a single body in which a single member includes both the main surface and the side. The mobile terminal 100 is formed by combining the first case 111' and the second case 112', forming a bar type mobile terminal.

Referring to FIG. 9, the lighting tube 151 is disposed adjacent to the side of the first case 111' and the second case 112', and a light-transmissive portion 111c allowing light transmission therethrough is formed at an upper side corresponding to the lighting tube 151. When the light-transmissive portion 111c is formed over the first case 111' and the second case 112', the line formed between the two cases may not be easily recognized by the light-transmissive portion 111c.

The light-transmissive portion 111c may be formed along the entire circumference of the mobile terminal 100, and the lighting tube 151 may also be formed to extend throughout the entire section of the mobile terminal. In this embodiment, the entire region of the side may be evenly formed as the light-transmissive portion, but the width of the light-transmissive portion 111c may vary along the circumference of the first case 111'. Accordingly, various patterns, forms, letters may be expressed by light transmission with respect to the light-transmissive portion 111c.

For the formation of the light-transmissive portion 111c, the first case 111' may be made of a transparent material, and an opaque material may be coated on the region covering the light-transmissive portion 111c. The opaque material may be coated on the main surface to define the transparent window 113a'.

According to this method, the portions to which light is output, such as the window region 113a' and the light-transmissive portion 111c, may not be separately fabricated from other parts but form a portion of the first case 111' and the second case 112'. This is advantageous in that the external appearance of the mobile terminal 100 is not complex even with the light-transmissive portion 111c.

Figure 10:
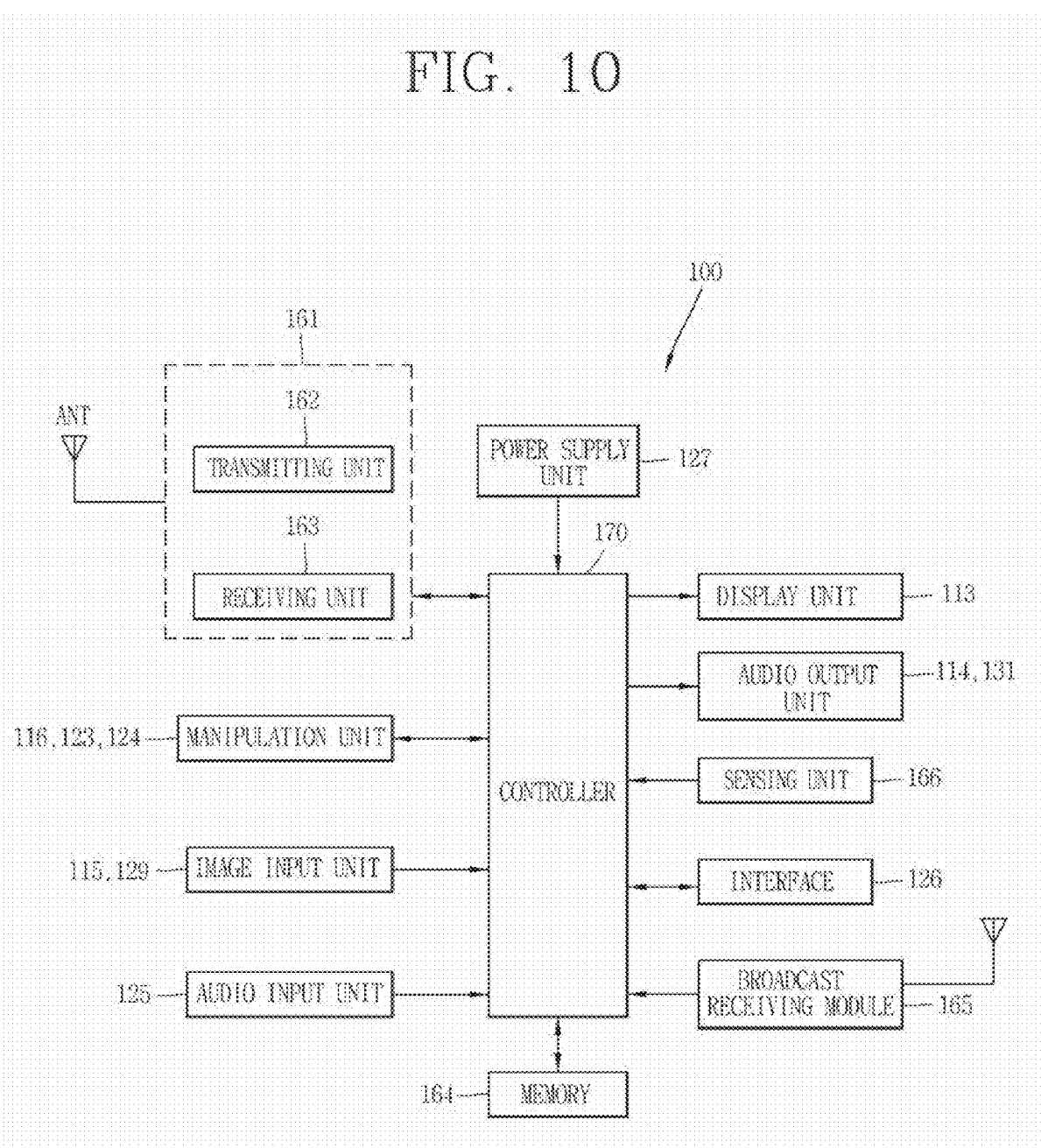
FIG. 10 is a block diagram illustrating components of a mobile terminal according to an embodiment of the present invention.

FIG. 10 is a block diagram of a mobile terminal according to an embodiment of the present invention. With reference to FIG. 10, the mobile terminal 100 includes a wireless communication module 161, the manipulation units 116, 123 and 124, the image input units 115 and 128, the audio input unit 125, the display unit 113, the audio output units 114 and 131, a sensing unit 166, the interface 126, a broadcast receiving module 165, a memory 164, the power supply unit 127, and the controller 170.

The controller 170 generally controls the general operation of the mobile terminal 100. For example, the controller 170 performs controlling and processing related to a voice call, data communication, a video call, or the like.

The wireless communication module 161 transmits/receives radio signals to/from a mobile communication base station via an antenna. For example, the wireless communication module 161 handles transmission/reception of audio data, text data, video data, and control data under the control of the controller 170, and includes a transmitting unit 162 that modulates a signal to be transmitted and transmits the modulated signal and a receiving unit 163 that demodulates a received signal.

The manipulation units 116, 123 and 124 may be configured as shown in FIG. 1 and provides key input data, input by the user to control the operation of the mobile terminal 100, to the controller 170. The manipulation units 116, 123 and 124 may be formed as a dome switch, a jog wheel, a jog switch, a touch pad such as static pressure/capacitance, and the like.

The image input units 115 and 129 process an image frame such as a still image or video obtained by an image sensor in a video calling mode or in an image capturing mode. The processed image frame may be converted into image data that can be displayed or output on the display unit 113. The image frame processed by the image input units 115 and 129 may be stored in the memory 164 or transmitted to the exterior via the wireless communication module 161 under the control of the controller 170.

The audio input unit 125 receives by a microphone an external audio signal in a calling mode, recording mode, voice recognition mode, or the like, and processes it into electrical voice data. During the calling mode, the processed voice data may be converted for output into a format that can be transmittable to the mobile communication base station via the wireless communication module 161. In the case of the recording mode, the processed voice data is output so as to be stored in the memory 164. The audio input unit 125 may include assorted noise canceling algorithms to cancel noise generated in the course of receiving the external audio signal.

The display unit 113 displays and outputs information processed in the mobile terminal 100. For example, when the mobile terminal 100 is in a calling mode, the display unit 113 displays User Interface (UI) or a Graphic User Interface (GUI) related to a call under the control of the controller 170. When the mobile terminal 100 is in a video calling mode or an image capturing mode, the display unit 113 displays a captured or/and received image or UI and GUI under the control of the controller 170. If the display unit 13 includes a touch screen, the display unit 113 may also be used as an input unit as well as the output unit.

The audio output units 114 and 131 convert and output audio data which has been received from the wireless communication module 161 in a call signal reception mode, a calling mode, a recording mode, a voice recognition mode, a broadcast reception mode, or the like, or output audio data which has been stored in the memory 164.

In addition, the audio output units 114 and 131 output an audio signal related to a function, such as a call signal reception sound, a message reception sound, or the like, performed in the mobile terminal 100. The audio output units 114 and 131 may include a speaker, a receiver, a buzzer, and the like.

The sensing unit 166 senses a current state of the mobile terminal 100 such as an opened or closed state of the mobile terminal, a location of the mobile terminal, or whether the mobile terminal is being touched or not by the user, and generates a sense signal for controlling the operation of the mobile terminal. For example, if the mobile terminal 100 is a slide phone, the sensing unit 166 may sense whether the slide phone is opened or closed and output the sensing result to the controller 170 to control the operation of the mobile terminal. In addition, the sensing unit 166 handles a sensing function as to whether or not the power supply unit 127 supplies power or whether or not the interface unit 126 is combined with an external device.

The interface 126 serves to interface with every external device connected with the mobile terminal 100. For example, the external devices may include a wired/wireless headset, an external charger, a wired/wireless data port, and a card socket for coupling a memory card, a SIM/UIM card, or the like. The interface 126 may receive data from the external device or provided with power and transfer the received data or power to each element of the mobile terminal 100 or transmit internal data of the mobile terminal to an external device.

The memory 164 may store a program for processing and controlling performed by the controller 170, and may temporarily store input or output data, such as a phone book, a message, a still image, or video, or the like. The memory 164 may also store a program for controlling an operation of the mobile terminal 100 related to the present invention. The memory 164 may include a storage medium of at least one of a hard disk type memory, a flash memory, a RAM, a ROM, or a card type memory such as an SD or XD memory, or the like.

The broadcast receiving module 165 may receive a broadcast signal transmitted through a satellite or terrestrial waves, convert it into a broadcast data format that can be output to the audio output units 114 and 131 and the display unit 113, and output the same to the controller 170. In addition, the broadcast receiving module 165 receives supplementary data such as Electric Program Guide (EPG), a channel list, or the like associated with a broadcast. The broadcast data converted in the broadcast receiving module 165 and the supplementary data may be stored in the memory 164.

The power supply unit 127 receives external or internal power and supplies power required for an operation of each element under the control of the controller 170. If the LED, light emitting element constituting the light emitting unit 140, is a three-color (RGB) LED, seven colors may be output by combining by itself. If a pair of LEDs constituting the first light emitting unit 141 are all 3-color LEDs, light proceeding to outside after being transmitted via the lighting tube 151 may be more various combinations.

In addition, when the pair of LEDs emit light simultaneously or sequentially under the control of the controller 170, various light emission patterns may be implemented. Various light emission patterns may be formed according to light emission by the second light emitting unit 142 as well as the first light emitting unit 141.

When the light emission is associated with a call reception or a text message reception, the above-described situation can be more easily recognized when the mobile terminal 100 is placed on the desk or table. This is because the direction of the user's eyes corresponds to the side where the light-transmissive portion is formed rather than the main surface of the mobile terminal 100.

According to the mobile terminal according to the present invention, light transmitted via the light transmission member after being generated from the light emitting unit proceeds to the outside via the light-transmissive portion formed at the side crossing the main surface where the display unit is disposed, thus providing aesthetical point and allowing the user or people around the mobile terminal to recognize the mobile terminal more easily. In addition, by outputting light via the light-transmissive portion, particular information can be provided to the user because the mobile terminal can adopt a new type of information expression.

Because the guiding portion is formed at the light transmission member transmitting light output from the light emitting unit, light can proceed to the light-transmissive portion more effectively. Therefore, the amount of light output via the light-transmissive portion can be increased by using the same light emitting unit.

Because the frame is formed separately from the cover, operation for installing the light transmission member can be facilitated easily. In addition, because the second light emitting is provided in addition to the first light emitting unit operating in relation to the light transmission member, light emission states having a plurality of different forms may be displayed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a housing comprising a light emitting portion disposed on at least a portion of the housing;
a light emitting unit disposed inside the housing;
a light transmission member configured to transmit light emitted from the light emitting unit; and
a guiding structure formed on the light transmission member and configured to direct and emit the light toward the light emitting portion,
wherein the guiding structure comprises at least one recessed portion, and
wherein the at least one recessed portion is regularly spaced or variably spaced such that the at least one recessed portion is more densely spaced at a portion of the light transmission member.

2. The mobile terminal of claim 1, wherein the at least one recessed portion is formed in a spiral pattern such that a spiral groove is formed along at least a portion of a circumferential surface of the light transmission member.

3. The mobile terminal of claim 1, wherein the light transmission member comprises a lighting tube or an optical fiber extending in a lengthwise direction.

4. The mobile terminal of claim 3, wherein the housing comprises a channel to receive the light transmission member, the channel formed by at least a pair of separation walls.

5. The mobile terminal of claim 4, wherein a reflective pattern is formed on at least one of the pair of separation walls to direct the emitted light toward the light emitting portion.

6. The mobile terminal of claim 1, further comprising:
a condensing unit enclosing the light emitting unit and an end portion of the light transmission member to condense the light emitted from the light emitting unit and direct the condensed light toward the end portion of the light transmission member.

7. The mobile terminal of claim 1, wherein one portion of the light emitting portion is wider than other portions of the light emitting portion.

8. The mobile terminal of claim 1, wherein the light emitting unit comprises first light emitting elements disposed at a first region to be associated with the light transmission member and second light emitting elements disposed at a second region to emit light toward a portion of the housing where the light transmission member is not disposed.

9. The mobile terminal of claim 8, wherein the first light emitting elements and the second light emitting elements are controlled and operated independently.

10. The mobile terminal of claim 1, wherein the light emitting unit is operated in a plurality of modes, each of the plurality of modes determined according to a type of operation performed in the mobile terminal.

11. The mobile terminal of claim 1, further comprising:
a reflective layer formed adjacent to the light emitting portion of the housing and configured to reflect the light toward the light emitting portion.

12. A mobile terminal comprising:
a cover having a window region covering a display module;
a frame coupled to the cover and having an opening at a central region of the frame to receive the display module;
a light emitting unit disposed in a space confined by the cover and the frame;
a light transmission member disposed and extended along at least a portion of contour of the frame to receive and transmit light generated from the light emitting unit; and
a guiding structure formed at the light transmission member and configured to guide light transmission in a direction that is away from a lengthwise direction of the light transmission member to emit the light toward the frame,
wherein the frame is made of a material allowing the light to be transmitted therethrough,
wherein the guiding structure comprises at least one recessed portion, and
wherein the at least one recessed portion is regularly spaced or variably spaced such that the at least one recessed portion is more densely spaced at a portion of the light transmission member.

13. The mobile terminal of claim 12, wherein at least a portion of the cover is made of a material that is different from the material of the frame.

14. The mobile terminal of claim 12, further comprising a support formed at a portion adjacent to the opening of the frame to support the light emitting unit.

15. The mobile terminal of claim 14, wherein an input region is formed on the cover at a region different from the window region of the cover and the light emitting unit is disposed on a surface of a circuit board which faces the support, the circuit board having a sensor corresponding to the input region.

16. The mobile terminal of claim 15, wherein the light emitting unit comprises a plurality of light emitting elements and at least one of the plurality of light emitting elements is associated with at least one of both end portions of the light transmission member, the at least one of the plurality of light emitting elements enclosed in a condensing unit to which the at least one of the both end portions of the light transmission member is inserted.

17. The mobile terminal of claim 12, wherein an outer surface of the frame forms a surface crossing a surface of the cover where the window region is formed.

18. The mobile terminal of claim 12, wherein the window region is disposed on a main surface of the cover and the light generated from the light emitting unit is emitted through at least a portion of a side surface of the frame, the side surface of the frame crossing the main surface of the cover.

19. A mobile terminal comprising:
a cover having a window region covering a display module;
a frame coupled to the cover and having an opening at a central region of the frame to receive the display module;
a light emitting unit disposed in a space confined by the cover and the frame;
a light transmission member disposed and extended along at least a portion of contour of the frame to receive and transmit light generated from the light emitting unit; and
a guiding structure formed at the light transmission member and configured to guide light transmission in a direction that is away from a lengthwise direction of the light transmission member to emit the light toward the frame,
wherein the frame is made of a material allowing the light to be transmitted therethrough, and
wherein the window region is disposed on a main surface of the cover and the light generated from the light emitting unit is emitted through at least a portion of a side surface of the frame, the side surface of the frame crossing the main surface of the cover.

* * * * *